3,024,230
POLYMERIC SALTS OF ALKYLENEIMINIUM TETRAPHENYLBORATE
William David English, Garden Grove, Calif., assignor to United States Borax & Chemical Corporation, Los Angeles, Calif., a corporation of Nevada
No Drawing. Filed Aug. 10, 1960, Ser. No. 48,557
6 Claims. (Cl. 260—239)

The present invention is a continuation-in-part of my application Serial No. 776,702 now abandoned dated November 28, 1958.

This invention relates as indicated to a composition of matter and has particular reference to new polymeric salts comprising poly(alkyleneiminium tetraphenylborate).

It is well known to those skilled in the art that poly(ethyleneimine) is soluble in water and insoluble in organic solvents. The compositions of the present invention are substantially insoluble in water and soluble in organic solvents. The present compositions will be found to be useful as herbicides and have the added advantage, when applied to the soil, of substantially no drift from the area of application.

The principal object of the present invention is to provide as new compositions of matter the polymeric salts poly(alkyleneiminium tetraphenylborate).

Other objects will appear as the description proceeds.

To the accomplishment of the foregoing and related ends, the invention then comprises the features hereinafter fully described and pointed out in the claims, the following description setting forth in detail certain illustrative embodiments of the invention, these being indicative, however, of but a few of the ways in which the principle of the invention may be employed.

Broadly stated, the present invention comprises as a new composition of matter the polymeric salts poly(alkyleneiminium tetraphenylborate) wherein the alkylene group has from 1 to 6 carbon atoms.

The polymeric salts of the present invention can be best illustrated by the following general formula:

$$[(RNH_2)^+(B\phi_4)^-]_n$$

where R means the divalent radicals derived from normal and branched chain hydrocarbons having from 1 to 6 carbon atoms.

Thus from the foregoing broadly stated paragraph and general formula it will be seen that the polymeric salts of the present invention comprise:

Poly(methyleneiminium tetraphenylborate)
Poly(ethyleneiminium tetraphenylborate)
Poly(propyleneiminium tetraphenylborate)
Poly(butyleneiminium tetraphenylborate)
Poly(amyleneiminium tetraphenylborate)
Poly(hexyleneiminium tetraphenylborate)

It is to be clearly understood that the various isomers of the alkylene groups, as well as the normal alkylene groups, are fully intended to be included in the compositions of the present invention.

So that the present invention can be more clearly understood the following example is given:

I.

An aqueous solution of 4.4 grams of poly(ethyleneimine) in about 20 ml. of water was adjusted to pH 3 by addition of dilute HCl. A solution of 17 grams of sodium tetraphenylborate (clarified with aluminum hydroxide) in water was added to the imine and a white precipitate formed. This was filtered, washed with water and dried at 60° C. for about 12 hours. Drying was completed in a vacuum desiccator over sulfuric acid. The resultant product poly(ethyleneiminium tetraphenylborate) was soluble in acetone, dioxane, chloroform and ethyl acetate and was insoluble in water.

The rest of the polymeric salts of the invention can be prepared in an identical manner by using the corresponding poly(alkyleneimine).

As stated previously, the poly(alkyleneiminium tetraphenylborates) have found utility as herbicides. They may be applied to the soil as solids; however, due to their low solubility in water when rapid phytotoxic results are desired, they may be applied as a solution of the poly(alkyleneiminium tetraphenylborate) in a hydrocarbon fuel oil or other organic solvent. The following example is illustrative of the manner in which these compounds can be used:

A saturated solution of poly(ethyleneiminium tetraphenylborate) in xylene was prepared. The solution was then sprayed on test plots containing such plants as oats, flax, cucumber, field peas, pigwood, mustard, beans and sugar beets in amounts equivalent to form about 5 pounds to about 50 pounds of poly(ethyleneiminium tetraphenylborate) per acre. Herbicidal effects were noted on all test plots, and on plots where the addition rate was equivalent to from about 25 pounds to about 50 pounds of poly(ethyleneiminium tetraphenylborate) per acre 90% to 100% kill was noted after 30 days.

Other modes of applying the principle of the invention may be employed provided the features stated in any of the following claims or the equivalent of such be employed.

I, therefore, particularly point out and claim as my invention:

1. As a new composition of matter the polymeric salts poly(alkyleneiminium tetraphenylborate) wherein the alkylene group has from 1 to 6 carbon atoms.
2. As a new composition of matter poly(methyleneiminium tetraphenylborate).
3. As a new composition of matter poly(ethyleneiminium tetraphenylborate).
4. As a new composition of matter poly(propyleneiminium tetraphenylborate).
5. As a new composition of matter poly(butyleneiminium tetraphenylborate).
6. As a new composition of matter poly(amyleneiminium tetraphenylborate).

No references cited.